(12) United States Patent
Akamatsu et al.

(10) Patent No.: US 7,333,283 B2
(45) Date of Patent: Feb. 19, 2008

(54) DISK DRIVE DEVICE WITH TEMPERATURE AND HUMIDITY CONTROL

(75) Inventors: Naotoshi Akamatsu, Fujisawa (JP); Yuji Fujita, Yokohama (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/230,359

(22) Filed: Sep. 19, 2005

(65) Prior Publication Data

US 2006/0066974 A1 Mar. 30, 2006

(30) Foreign Application Priority Data

Sep. 24, 2004 (JP) ............... 2004-276568

(51) Int. Cl.
*G11B 19/02* (2006.01)
*G11B 33/14* (2006.01)

(52) U.S. Cl. ..................... 360/69; 360/97.02
(58) Field of Classification Search .............. None
See application file for complete search history.

(56) References Cited

U.S. PATENT DOCUMENTS

| | | | | |
|---|---|---|---|---|
| 4,685,303 A * | 8/1987 | Branc et al. ............... 62/3.3 |
| 5,059,291 A * | 10/1991 | Yamauchi et al. ............ 204/252 |
| 5,096,549 A * | 3/1992 | Yamauchi et al. ............ 205/625 |
| 5,293,286 A * | 3/1994 | Hasegawa et al. .......... 360/97.02 |
| 6,453,679 B1 * | 9/2002 | Aoyagi et al. ................ 62/3.4 |
| 6,735,044 B2 * | 5/2004 | Tomioka ................... 360/97.02 |
| 6,867,939 B2 * | 3/2005 | Katahara et al. .............. 360/53 |

FOREIGN PATENT DOCUMENTS

JP 02-001004 A 1/1990

* cited by examiner

*Primary Examiner*—Andrew L. Sniezek
(74) *Attorney, Agent, or Firm*—Townsend and Townsend and Crew LLP; Duke Amaniampong

(57) ABSTRACT

Embodiments of the invention provide a disk drive device excellent in reliability that can reduce influence of a temperature change in an environment of use. In one embodiment, a disk drive device includes a disk drive mechanism that records information in a disk or reproduces information stored in the disk and a housing in which the disk drive mechanism is housed. The disk drive device further includes a humidity control element that controls humidity in the inside of the housing, a temperature sensor that detects ambient temperature of the disk drive device or temperature of a portion where temperature changes substantially in the same manner as the ambient temperature, and a control circuit that controls the temperature control element on the basis of a rapid change in temperature detected by the temperature sensor.

25 Claims, 8 Drawing Sheets

DISK DRIVE DEVICE WITH TEMPERATURE AND HUMIDITY CONTROL

CROSS-REFERENCES TO RELATED APPLICATIONS

This application claims priority from Japanese Patent Application No. JP2004-276568, filed Sep. 24, 2004, the entire disclosure of which is incorporated herein by reference.

BACKGROUND OF THE INVENTION

The present invention relates to a disk drive device and is, in particular, suitable for a disk drive device that is mounted on a portable apparatus and an information apparatus for vehicles.

In environments of use of portable apparatuses and information apparatuses for vehicles, in general, temperature and humidity change in a wide range compared with those used in offices, computer rooms, and the like and often involve rapid changes. In disk drive devices exposed to such environments, temperature in a housing, in which a disk is housed, changes rapidly and significantly to affect reliability of the apparatuses significantly. In a high-humidity environment, a head and a disk may attract each other to be damaged because of partial moisture condensation. In addition, corrosion of a magnetic metal layer may progress on a head surface and a disk surface. Consequently, recording and reproducing functions deteriorate. On the other hand, under low humidity, a lubricating function of a lubricant coated on the disk surface falls and wear of the head and the disk progresses. Therefore, in order to secure reliability of the disk drive devices, it is important to keep humidity in the housing as constant as possible in an appropriate range.

As humidity control in conventional disk drive devices, for example, moisture absorbing members such as silica gel, activated carbon, and a moisture absorbing film are set in housings. A main object of these moisture absorbing members is to decrease humidity. A control method of increasing humidity in the case of low humidity is not taken into account. In addition, moisture absorbing abilities of these moisture absorbing members substantially depend on volumes thereof. Thus, in order to cope with severe environments, it is necessary to increase sizes of the moisture absorbing members. This is an obstacle to a reduction in size and a reduction in cost of the disk drive devices.

Thus, the magnetic disk device described in JP-A-2-1004 (patent document 1) has been devised. This magnetic disk device of the patent document 1 is mounted with a humidity control element having a hydrogen ion conductor and makes reversible humidity control possible according to voltage control. The magnetic disk device also makes it possible to control speed of a dehumidification amount and a humidification amount according to an applied voltage value. This humidity control element includes a hydrogen ion conductor consisting of a solid electrolyte and a pair of electrodes sandwiching this hydrogen ion conductor. The humidity control element communicatively connects one of the electrodes to the outside of a housing (a container) and communicatively connects the other electrode to the inside of the housing. By changing a direction of a DC voltage applied to the electrodes, it is possible to switch dehumidification and humidification in the housing by the hydrogen ion conductor.

This patent document 1 discloses a control method of performing operation of the humidity control element after detecting a start instruction or a stop instruction for a motor and a control method of performing operation of the humidity control element after detecting humidity in the housing with a humidity sensor.

BRIEF SUMMARY OF THE INVENTION

In a disk drive device mounted on a portable apparatus and an information apparatus for vehicles, in particular, problems occur when moisture condensation is caused on a head and a disk following a rapid fall in temperature outside a housing and when a disk surface dries following a rapid rise in ambient temperature.

The former case of the moisture condensation will be explained specifically. The head and the disk in the disk drive device are connected to the housing via a component having a satisfactory thermal conductivity such as an actuator arm or a spindle motor. When temperature outside the housing falls rapidly, temperature in the housing also falls quickly following the temperature fall. Then, the head and the disk are cooled rapidly because of solid thermal conduction of the component with a satisfactory thermal conductivity. Therefore, temperature of the head and the disk falls quickly following the temperature in the outside of the housing. On the other hand, since the entire air in the housing is cooled by convection, temperature of the air falls considerably later than the fall in temperature of the head and the disk. Consequently, whereas a rise in relative humidity of the entire air in the housing delays considerably, a rapid rise in relative humidity occurs on surfaces of the head and the disk. As a result, moisture condensation occurs on the head and the disk.

The latter case of the drying of the disk surface will be explained specifically. The disk in the disk drive device is connected to the housing via the component with a satisfactory thermal conductivity such as a spindle motor as described above. When temperature outside the housing rises rapidly, temperature in the housing rises quickly following the rise in the temperature outside the housing. The disk is heated rapidly because of solid thermal conductivity of the component with a satisfactory thermal conductivity. Therefore, temperature of the disk rises quickly following the temperature outside the housing. On the other hand, since the entire air in the housing is heated by convection, temperature of the air rises considerably later than the rise in temperature of the disk. Consequently, whereas a fall in relative humidity of the entire air in the housing delays considerably, a rapid fall in relative humidity occurs on the surface of the disk. As a result, the disk surface dries.

However, in the control method of performing operation of the humidity control element after detecting a start instruction or a stop instruction for a motor in the patent document 1, it is impossible to cope with the moisture condensation on the head and the disk and the dry on the disk surface due to a rapid change in temperature outside the housing. In addition, in the control method of performing operation of the humidity control element after detecting humidity in the housing with a humidity sensor in the patent document 1, start of the humidity control element is delayed with respect to a rapid change in temperature outside the housing due to the reason described above. As a result, there is a problem in that humidity on the surfaces of the head and the disk deviate from a proper humidity range for a longer time and functions of these components are deteriorated and reliability of the disk drive device falls.

It is a feature of the invention to provide a disk drive device excellent in reliability that can reduce influence of a temperature change in an environment of use.

One aspect of the invention provides a disk drive device including a disk drive mechanism that records information in a disk or reproduces information stored in the disk and a housing in which the disk drive mechanism is housed. The disk drive device is constituted to include: a humidity control element that controls humidity in the housing; a temperature sensor that detects ambient temperature of the disk drive device or temperature of a portion where temperature changes substantially in the same manner as the ambient temperature; and a control circuit that controls the humidity control element on the basis of a rapid change in temperature detected by the temperature sensor.

Preferable specific examples of a structure of the invention are as described below.

(1) The humidity control element performs dehumidification and humidification of the inside of the housing.

(2) The humidity control element includes a hydrogen ion conductor consisting of a solid electrolyte and at least two electrodes arranged in contact with the hydrogen ion conductor.

(3) The control circuit is adapted to control the humidity control element when temperature detected by the temperature sensor is outside a predetermined temperature range.

(4) The disk drive device has a humidity sensor that detects humidity in an inner space of the disk drive device. The control circuit is adapted to control the humidity control element on the basis of temperature detected by the temperature sensor and humidity temperature detected by the humidity sensor.

(5) The control circuit is adapted to control the humidity control element on the basis of humidity temperature detected by the humidity sensor when the temperature detected by the temperature sensor is within a predetermined temperature range.

(6) The disk drive device includes a circuit board mounted with the control circuit and set outside the housing and a cover that covers the outside of the circuit board. The temperature sensor is mounted on the circuit board and held between the circuit board and the cover.

(7) The temperature sensor is set in abutment against the housing.

(8) The disk drive device includes a circuit board mounted with the control circuit and set outside the housing. The temperature sensor is mounted on the circuit board and held between the circuit board and the housing.

(9) The temperature sensor is set to detect temperature of components constituting the disk drive mechanism connected to the housing heat-conductively.

According to the invention, it is possible to provide a disk drive device excellent in reliability that can reduce influence of a temperature change in an environment of use.

DETAILED DESCRIPTION OF THE INVENTION

Figure 1:
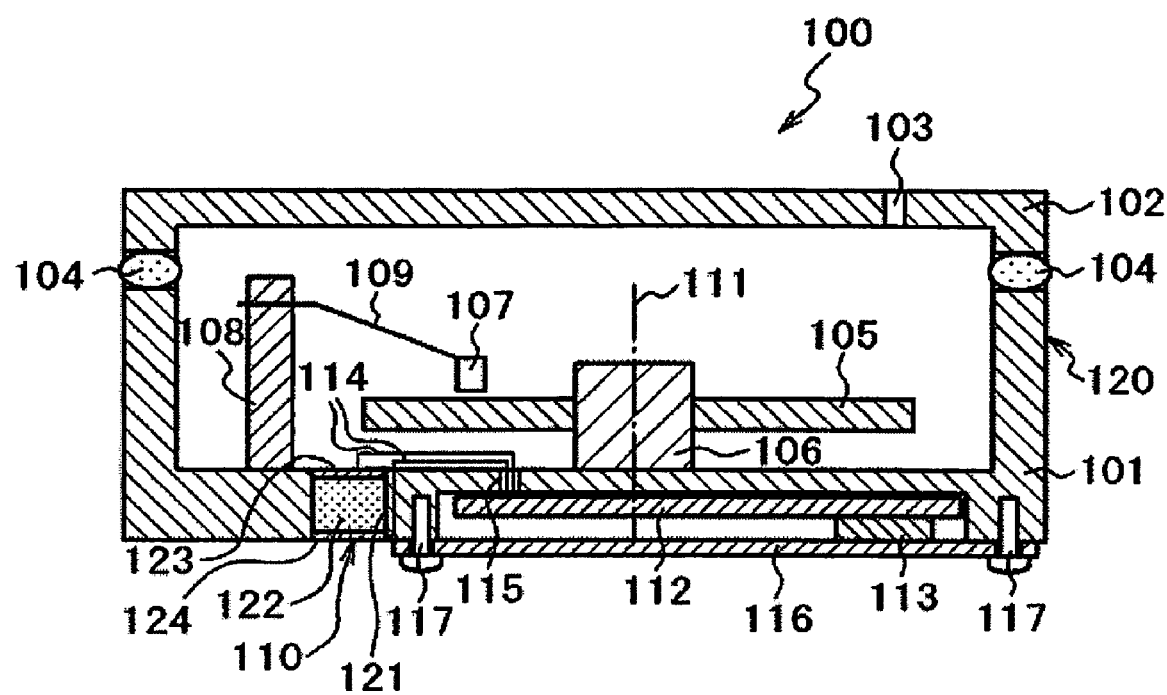
FIG. 1 is a vertical sectional view of a disk drive device in a first embodiment of the invention.

Plural embodiments of a disk drive device according to the invention will be explained using the figures. Identical reference numerals in the figures of the respective embodiments denote identical objects or equivalents thereof.

An overall structure of the disk drive device in the embodiments will be explained with reference to FIG. 1. FIG. 1 is a diagram of a disk drive device 100 in a first embodiment of the invention cut along a disk rotation axis 111. Note that the disk drive device 100 in this embodiment is an example of a magnetic disk drive device.

The disk drive device 100 includes a disk 105, a spindle motor 106, a head 107, a head drive mechanism 108, a suspension arm 109, a humidity control element 110, a circuit board 112, a temperature sensor 113, and a housing 120 as main components.

The housing 120 includes a base 101 and a cover 102 and is formed in a box shape having a closed inner space. A fine breathing hole 103, which communicatively connects the inner space of the housing 120 and an outer space, is formed in the cover 102. The base 101 and the cover 102 are made of a metal material such as aluminum. A sealing member 104 is provided between the base 101 and the cover 102. A disk drive mechanism including the disk 105, the spindle motor 106, the head 107, the suspension arm 109, and the head drive mechanism 108 is incorporated in the inner space of the housing 120.

The disk 105 has a recording surface on an upper side thereof and is attached to the spindle motor 106. In this embodiment, a disk 105 with a diameter of 3.5 inches is used. The spindle motor 106 is a motor for rotating the disk 105 and is attached to a bottom wall of the base 101. The disk 105 is connected to the base 101 heat-conductively through the spindle motor 106.

The head 107 is a head for recording information in the disk 105 or reproducing information in the disk 105. The head 107 is supported by the suspension arm 109 to be located above the disk 105 and slightly lifted from the surface of the disk 105 and operated by an air flow that is generated when the disk 105 rotates. The suspension arm 109 is supported by the head drive mechanism 108. The head drive mechanism 108 is a mechanism for rotationally moving the suspension arm 109 to move the head 107 in a radial direction of the disk 105. The head drive mechanism 108 is attached to the bottom wall of the base 101. The head 107 is connected to the base 101 heat-conductively through the suspension arm 109 and the head drive mechanism 108.

The humidity control element 110 is attached to a through hole 121 that pierces through a part of the base 101. This through hole 121 is provided in a part of the bottom wall of the base 101, where the circuit board 112 is set, to be adjacent to the circuit board 112 and the head drive mechanism 108. The humidity control element 110 includes a hydrogen ion conductor 122 consisting of a solid electrolyte and a pair of electrodes 123 and 124 sandwiching this hydrogen ion conductor 122. One electrode 123 is communicatively connected to the inside of the housing 120 and the other electrode 124 is communicatively connected to the outside of the housing 120. Wirings 114 for applying a voltage to the humidity control element 110 are lead out from electrodes 123 and 124 of the humidity control element 110 and electrically connected to the circuit board 112 through a through hole 115, which is provided in the base 101, together with wirings (not shown) lead out from the head 107, the mechanism head drive device 108, and the spindle motor 106. The wirings 114 include a flexible wiring board that is bendable. The humidity control element 110 can switch dehumidification and humidification in the housing 120 by the hydrogen ion conductor 122 by changing a direction of a DC voltage applied to the electrodes 123 and 124.

The circuit board 112 is set on the bottom surface of the base 101 and is mounted with electronic components such as an LSI necessary for recording and reproduction of data, electronic components necessary for drive of the humidity control element 110, and the like. These electronic components constitute a control circuit that controls the spindle motor 106, the head drive mechanism 108, the humidity control element 110, and the like. A recess is formed in the bottom surface of the base 101 and the circuit board 112 is housed in this recess. A cover 116 for protecting the circuit board 112 from the outside is attached further on the outer side of the circuit board 112 using screws 117. The cover 116 is made of a metal material with a satisfactory thermal conductivity.

The temperature sensor 113 is a sensor for detecting ambient temperature of the disk drive device or temperature of a portion where temperature changes substantially in the same manner as the ambient temperature. In this embodiment, the temperature sensor 113 detects temperature of the cover 116 made of metal, temperature of which changes substantially equally with the ambient temperature. Electrodes of the temperature sensor 113 are connected and fixed to a surface of the circuit board 112 by means such as soldering. The temperature sensor 113 is mounted to be sandwiched between the circuit board 112 and the cover 116.

Next, a basic operation of the disk drive device 100 with such a structure will be explained with reference to FIG. 1.

When operation of the disk drive device 100 is started, the spindle motor 106 is driven and the disk 105 is rotated at high speed. At the same time, the head drive mechanism 108 is driven and the head 107 is moved to a predetermined position of the disk 105. Consequently, recording or reproduction by the head 107 is performed.

On the other hand, the humidity control element 110 is not operated when the outside temperature of the disk drive device 100 is within a predetermined temperature range and is operated when the outside temperature is outside the predetermined temperature range. In other words, when the outside temperature of the disk drive device 100 is lower than the predetermined temperature range, the humidity control element 110 is operated to dehumidify the inside of the housing 120 with the electrode 123 as a positive pole and the electrode 124 as a negative pole. In addition, when the outside temperature is higher than the predetermined temperature range, the humidity control element 110 is operated to humidify the inside of the housing 120 with the electrode 123 as a negative pole and the electrode 124 as a positive pole.

Figure 2:
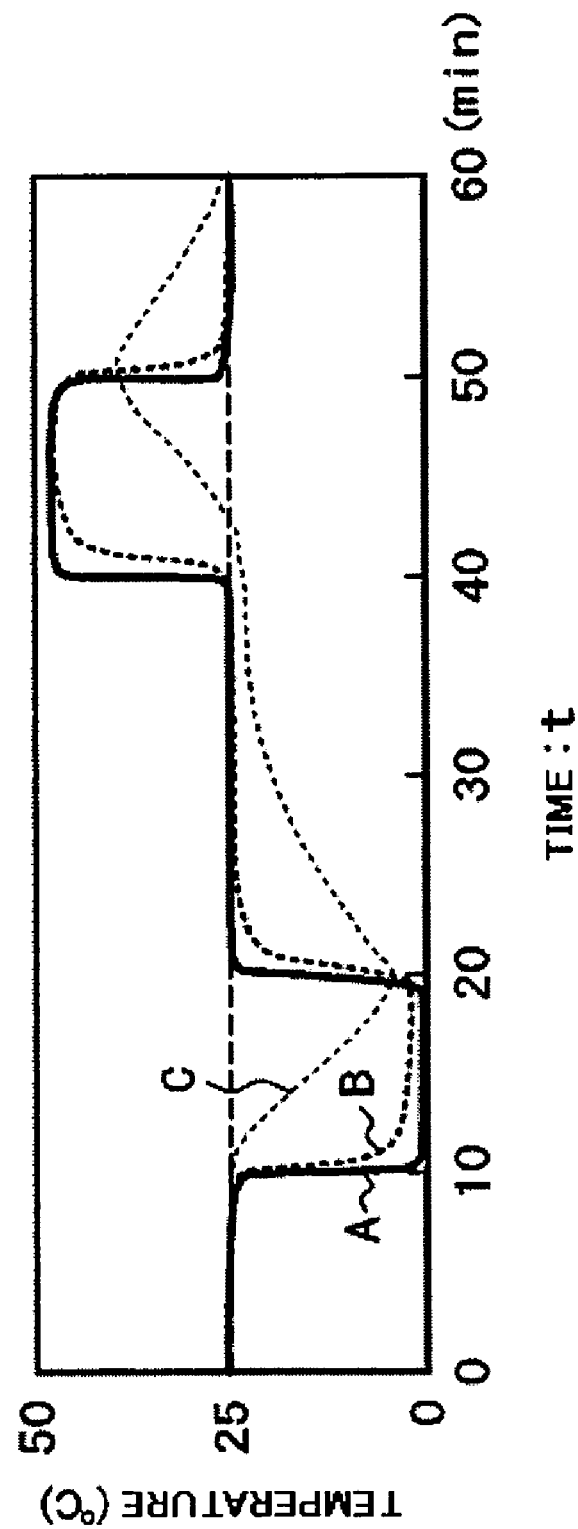
FIG. 2 is a graph showing a temperature change in the disk drive device in the first embodiment.
Figure 3:
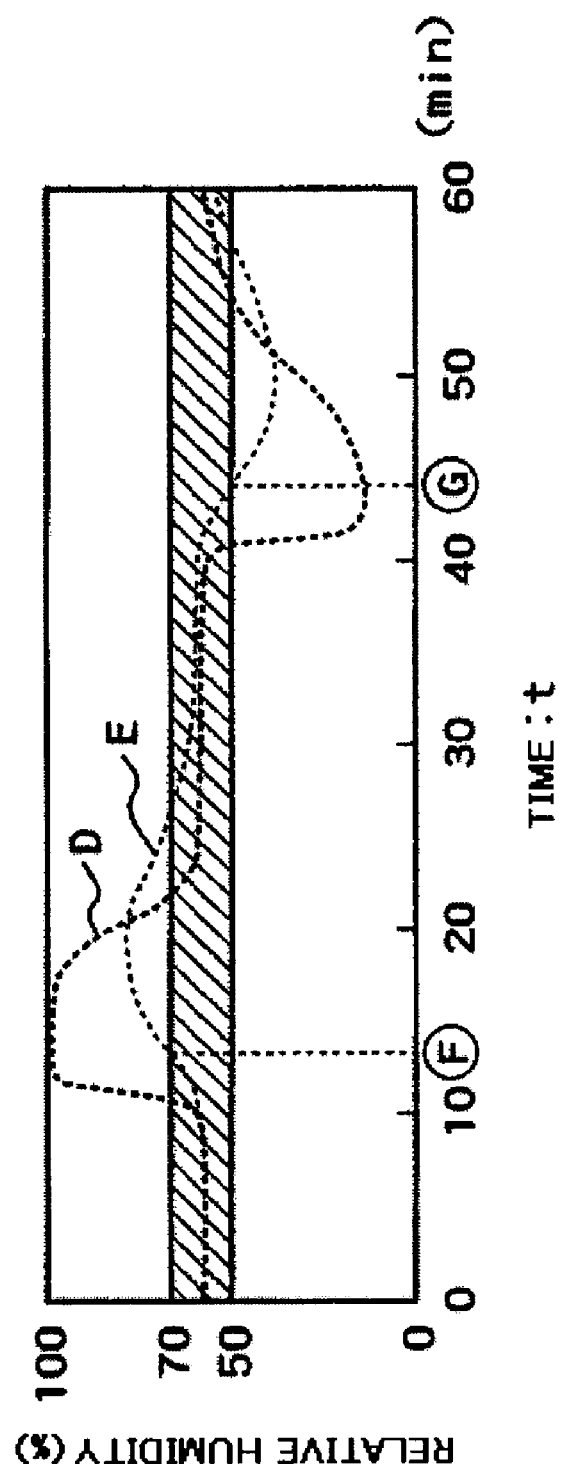
FIG. 3 is a graph showing a change in relative humidity in a conventional example following the temperature change in FIG. 2.
Figure 4:
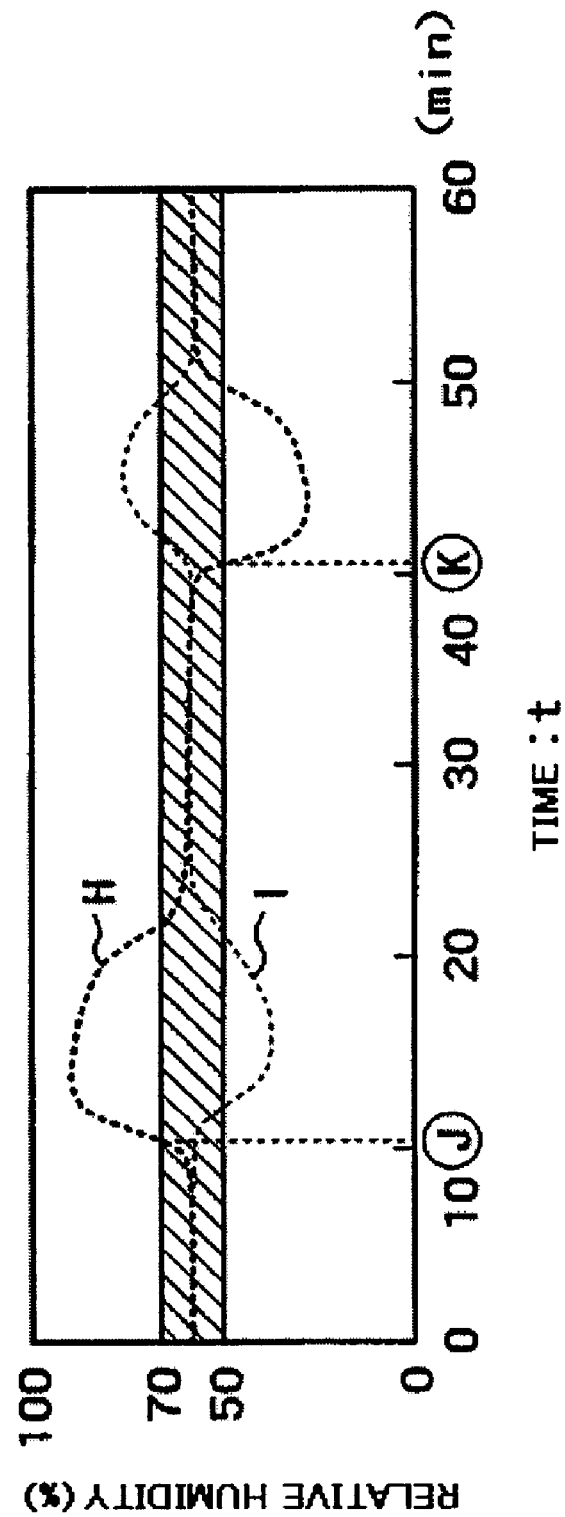
FIG. 4 is a graph showing a change in relative humidity in the first embodiment following the temperature change in FIG. 2.

Next, an operation of the disk drive device 100 at the time when the outside temperature of the disk drive device 100 changes rapidly will be explained with reference to FIGS. 2 to 4. FIG. 2 is a graph showing temperature changes in the disk drive device 100 in this embodiment. FIG. 3 is a graph showing a change in relative humidity in a conventional example following the temperature changes in FIG. 2. FIG. 4 is a graph showing a change in relative humidity in this embodiment following the temperature changes in FIG. 2.

First, FIG. 2 will be explained. FIG. 2 is a graph showing temperature changes in the inside of the device (inside of the housing) and the outside of the device that are measured when a temperature change in an environment of use in an information apparatus for vehicles is applied to the 3.5 inch disk drive device 100. A curve A indicates outside temperature of the disk drive device measured by the temperature sensor 113. A curve B indicates disk surface temperature measured by a temperature sensor connected to a disk surface. A curve C indicates temperature in the housing obtained by measuring the air in the housing with the temperature sensor.

In FIG. 2, in time t=10 min, the ambient temperature was rapidly lowered from 25° C. to 0° C. as indicated by the curve A. In this case, the disk surface temperature fell quickly following the curve A of the ambient temperature as indicated by the curve B. It is considered that this is because heat exchange is caused by the solid thermal conduction with a satisfactory thermal conductivity between the housing 120 and the disk 105. On the other hand, the air temperature in the housing fell gently as indicted by the curve C. It is considered that the air in the housing has a low thermal conductivity because heat of the air is exchanged by convection and temperature of the air falls considerably later than that of the components such as the disk 105.

In addition, in FIG. 2, in time t=40 min, the ambient temperature was rapidly raised from 25° C. to 45° C. as indicted by the curve A. In this case, the disk surface temperature rose quickly following the curve A of the outside temperature as indicated by the curve B. This is because heat exchange is caused by the satisfactory solid thermal conduction between the housing 120 and the disk 105 as at the time of temperature fall. The air temperature in the housing rose gently as indicated by the curve C. It is considered that this is because the air in the housing has a low thermal conductivity because of heat exchange by convection and temperature of the air rose considerably later than that of the components such as the disk 105 as at the time of temperature fall.

FIG. 3 is a graph showing a result at the time when the humidity control element is controlled with the conventional control method, that is, controlled by detecting humidity in the housing in the disk drive device to which the temperature change of the curve A in FIG. 2 is applied. A curve D indicates a result obtained by converting an output of the temperature sensor connected to the disk surface into humidity and indicating the humidity. A curve E indicates a result obtained by measuring the humidity of the air in the housing with the humidity sensor. In the conventional control method, the humidity control element is controlled with the humidity in the housing as a reference. Here, an algorithm for controlling the humidity control element when the humidity in the housing exceeds a range of 60% RH±10% is used.

When the ambient temperature rises rapidly in time t=10 min as indicated by the curve A in FIG. 2, the temperature of the air in the housing rises gently as indicated by the curve C in FIG. 2. Thus, the humidity of the air in the housing rises gently as indicated by the curve E in FIG. 3. Consequently, a moisture absorbing operation of the humidity control element is started at a point F where the humidity rises 70% RH or more (in other words, a point where considerable time elapses after the rapid temperature rise is started). However, at the point F, since the humidity on the disk surface reaches 100% RH as indicated by the curve D, there is a problem in that moisture condensation occurs on the disk surface.

In addition, when the ambient temperature falls rapidly in time t=40 min as indicted by the curve A in FIG. 2, the temperature of the air in the housing falls gently as indicated by the curve C in FIG. 2. Thus, the humidity of the air in the housing falls gently as indicated by the curve E in FIG. 3. Consequently, a humidification operation of the humidity control element is started at a point G where the humidity falls to 50% RH or more (in other words, a point where considerable time elapses after the rapid temperature fall starts). However, at the point G, since the humidity on the disk surface falls to about 20% RH as indicated by the curve D, there is a problem in that lubrication performance of a lubricant on the disk surface falls.

FIG. 4 is a graph showing a result at the time when the humidity control element 110 is controlled with the control method in this embodiment, that is, controlled by detecting outside temperature of the device in the disk drive device 100 to which the temperature change of the curve A in FIG. 2 is applied. A curve H indicates a result obtained by converting an output of the temperature sensor connected to the disk surface into humidity and indicating the humidity. A curve I indicates a result obtained by measuring the humidity of the air in the housing with the humidity sensor. In this embodiment, the humidity control element 110 is controlled with the temperature in the temperature sensor 113 mounted on the circuit board 112 as a reference. Here, an algorithm for controlling the humidity control element 110 when the temperature of the temperature sensor 113 exceeds a range of 25° C.±5° C. is used.

When the ambient temperature rises rapidly in time t=10 min as indicated by the curve A in FIG. 2, since the temperature sensor 113 is set between the housing 120 and the cover 116, an output of the temperature sensor 113 changes slightly later than the ambient temperature and changes slightly earlier than the disk surface temperature. In other words, the output of the temperature sensor 113 changes to trace an area between the curve A and the curve B shown in FIG. 2, that is, changes substantially in the same manner as the ambient temperature. Consequently, in this embodiment, a moisture absorbing operation of the humidity control element 110 is started at a point J where the output of the temperature sensor 113 falls to 20° C. or less (in other words, a point where short time elapses after the rapid temperature rise is started (time considerably earlier than the point F). As a result, the humidity in the housing temporarily fell to about 35% RH as indicated by the curve I. On the other hand, the humidity on the disk surface stayed at maximum 85% RH as indicated by the curve H and did not result in moisture condensation.

In addition, when the ambient temperature falls rapidly in time t=40 min as indicated by the curve A in FIG. 2, an output of the temperature sensor 113 changes to trace the area between the curve A and the curve B shown in FIG. 2, that is, changes substantially in the same manner as the ambient temperature. Consequently, in this embodiment, a moisture absorbing operation of the humidity control element 110 is started at a point K where the output of the temperature sensor 113 rises to 30° C. or more (in other words, a point where short time elapses after the rapid temperature rise is started (time considerably earlier than the point G). As a result, the humidity in the housing temporarily rose to about 75% RH as indicated by the curve I. On the other hand, the humidity on the disk surface stayed at minimum 30% RH as indicated by the curve H. Thus, time during which the disk drive device is exposed to low humidity could be reduced compared with the conventional example.

Figure 5:
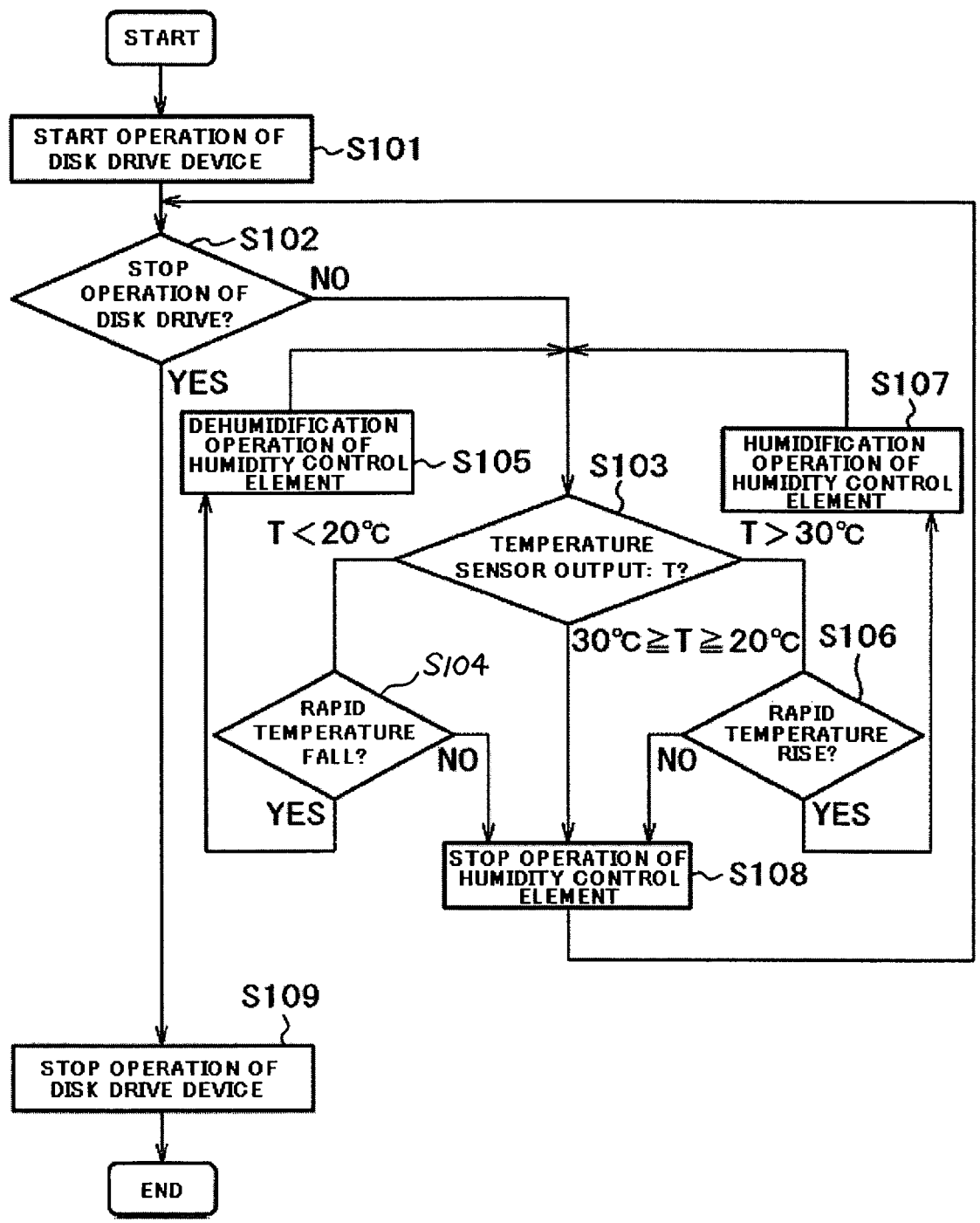
FIG. 5 is an operation flow of a control circuit of the disk drive device in this embodiment.

Next, an operation of the control circuit of the disk drive device 100 in this embodiment will be explained using FIG. 5. FIG. 5 is an operation flow of the control circuit of the disk drive device 100 in this embodiment.

The control circuit detects the start of power supply to the disk drive device 100 and a starting operation of the device (S101) and checks the presence or absence of a stop instruction for the disk drive (S102). If there is no stop instruction, the control circuit starts control of the humidity control device 110.

In the control of the humidity control element 110, first, the control circuit detects an output T of the temperature sensor 113 mounted on the circuit board 112 and compares the output T with an upper limit value and a lower limit value set in advance (S103). Here, for example, the lower limit value is set to 20° C. and the upper limit value is set to 30° C.

When T is lower than 20° C., the control circuit checks whether a rapid temperature fall has occurred (S104). If the rapid temperature fall has occurred, the control circuit supplies a signal for starting a dehumidification operation of the humidity control element 110 to the humidity control element 110 (S105). Consequently, the humidity control element 110 starts the dehumidification operation. Note that, as a method of detecting a rapid temperature fall or a rapid temperature rise, for example, it is conceivable to detect a temperature change of 10° C. or more in one minute.

When T is higher than 30° C. in S103, the control circuit checks whether a rapid temperature rise has occurred (S106). If the rapid temperature rise has occurred, the control circuit supplies a signal for starting a humidification operation of the humidity control element 110 to the humidity control element 110 (S107). Consequently, the humidity control element 110 starts the humidification operation.

When T is equal to or lower than 30° C. and equal to or higher than 20° C. in step S103, the control circuit stops the dehumidification operation or the humidification operation of the humidity control element 110 (S108).

As described above, the control for the humidity control element 110 is executed. Thereafter, the control circuit checks the presence or absence of a stop instruction for the disk drive again (S102). If the stop instruction for the disk drive is detected, the control circuit ends the control of the disk drive device 100 through a sequence of head retraction, disk rotation stop, circuit operation stop, and the like that are necessary for stopping the disk drive device 100 (S109).

According to this embodiment, in the disk drive device 100 including the disk drive mechanism that records information in the disk 105 or reproduces information stored in the disk 10 and the housing 120 in which the disk drive mechanism is housed, the disk drive device 100 has the humidity control element 110 that controls humidity in the inside of the housing 120, the temperature sensor 113 that detects ambient temperature of the disk drive device or temperature of a portion where temperature changes substantially in the same manner as the ambient temperature, and the control circuit that controls the humidity control element 110 on the basis of a rapid change in temperature detected by the temperature sensor 113. Thus, it is possible to start the humidity control element earlier than in the past and secure reliability of the disk drive device even in an environment in which ambient temperature changes rapidly.

Figure 6:
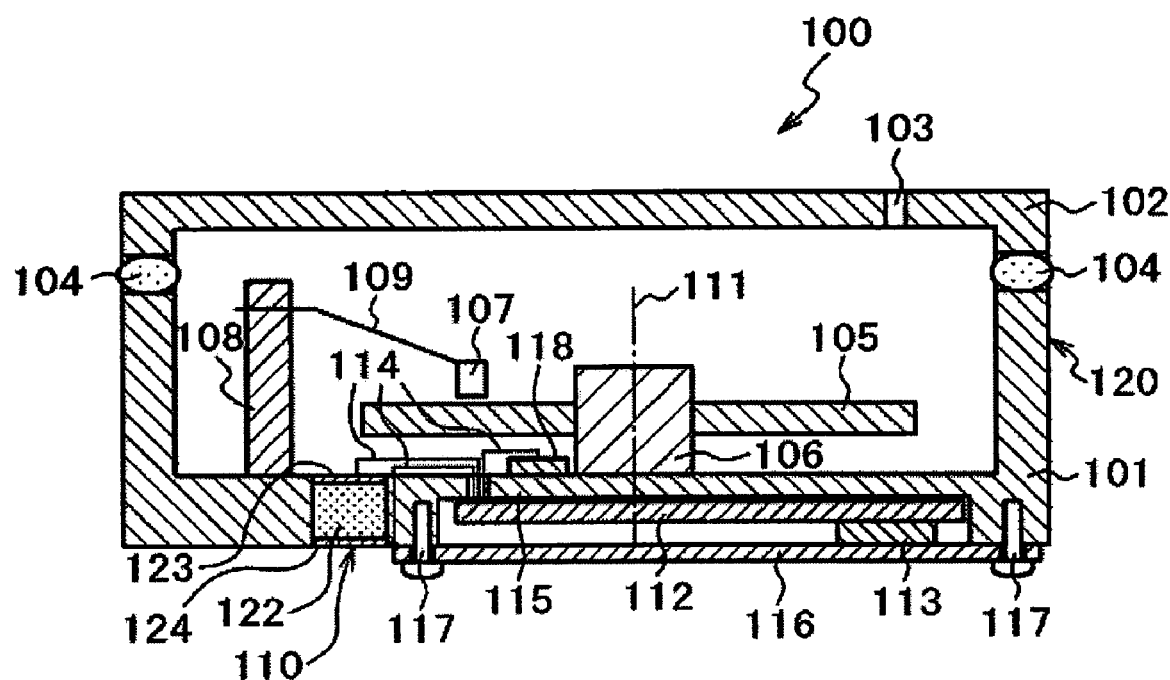
FIG. 6 is a vertical sectional view of disk drive device in a second embodiment of the invention.
Figure 7:
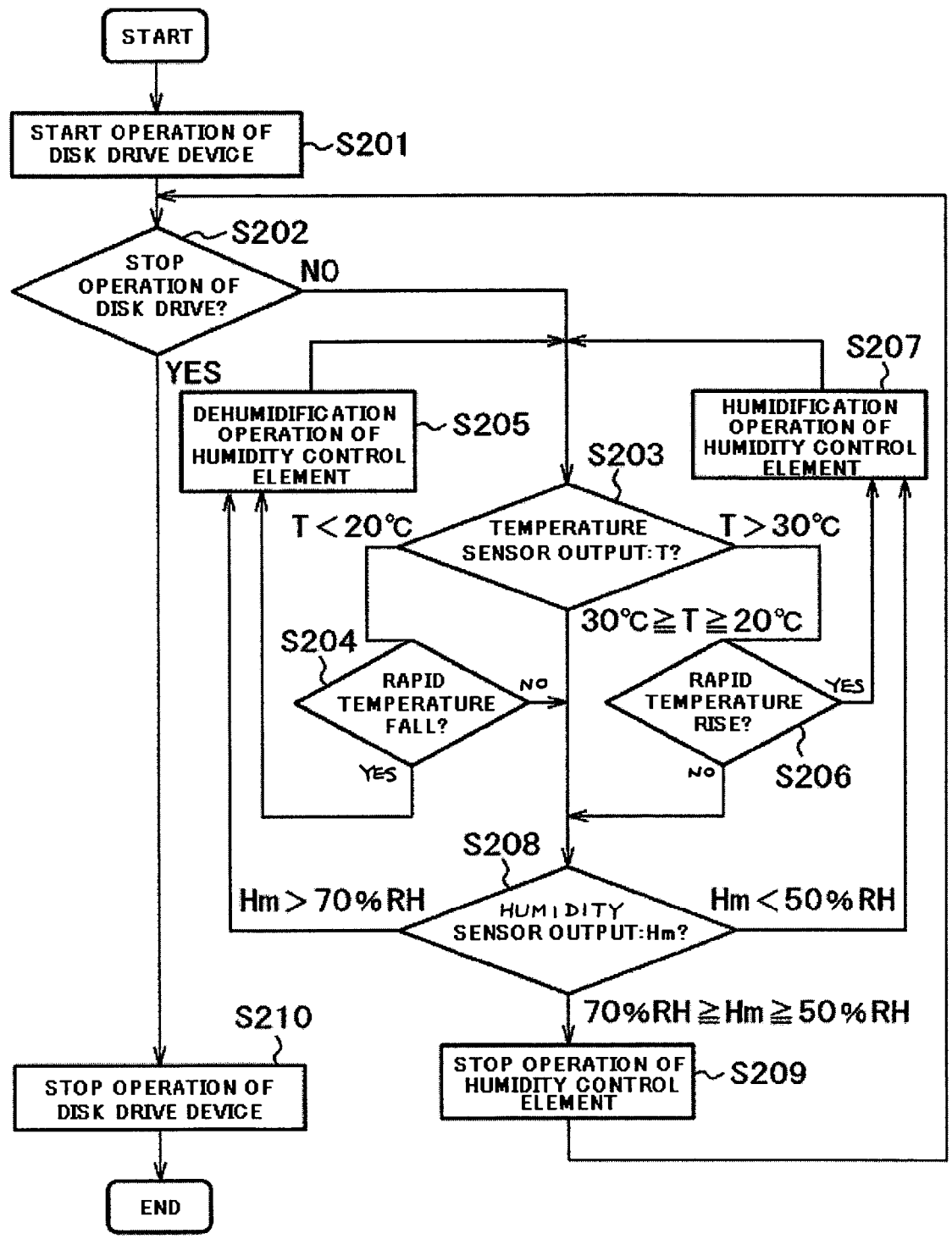
FIG. 7 is an operation flow of a control circuit of the disk drive device in the second embodiment.

Next, the disk drive device 100 in a second embodiment of the invention will be explained using FIGS. 6 and 7. FIG. 6 is a vertical sectional view of the disk drive device 100 in the second embodiment of the invention. FIG. 7 is an operation flow of a control circuit of the disk drive device 100 in FIG. 6. The second embodiment is different from the first embodiment in points described below and is basically identical with the first embodiment in the other points.

In the second embodiment, as shown in FIG. 6, a humidity sensor 118 for detecting humidity in a housing is set on a surface of the base 101. The wiring 114 lead out from the humidity sensor 118 are connected to the circuit board 112 through the through hole 115.

An operation of the control circuit in the second embodiment will be explained with reference to FIG. 7. As in the first embodiment, the control circuit detects the start of power supply to the disk drive device 100 and a starting operation of the device (S201) and checks the presence or absence of a stop instruction for the disk drive (S202). If there is no stop instruction, the control circuit starts control of the humidity control element 110.

In the control of the humidity control element 110, first, the control circuit detects an output T of the temperature sensor 113 mounted on the circuit substrate 112 and compares the output T with an upper limit value and a lower limit value set in advance (S203). Here, as in the first embodiment, the lower limit value is set to 20° C. and the upper limit value is set to 30° C.

When T is lower than 20° C., the control circuit checks whether a rapid temperature fall has occurred (S204). If the rapid temperature fall has occurred, the control circuit supplies a signal for starting a dehumidification operation of the humidity control element 110 to the humidity control element 110 (S205S204). Consequently, the humidity control element 110 starts the dehumidification operation.

When T is higher than 30° C. in S203, the control circuit checks whether a rapid temperature rise has occurred (S206). If the rapid temperature rise has occurred, the control circuit supplies a signal for starting a humidification operation of the humidity control element 110 to the humidity control element 110 (S207S205). Consequently, the humidity control element 110 starts the humidification operation.

When T is equal to or lower than 30° C. and equal to or higher than 20° C. in step S203S103, the control circuit detects an output Hm of the humidity sensor 118 and compares the output Hm with an upper limit value and a lower limit value set in advance (S208S209). Here, the upper limit value of the output Hm is set to 70% RH and the lower limit value thereof is set to 50% RH.

When Hm is higher than 70% RH, the control circuit supplies a signal for starting a dehumidification operation of the humidity control element 110 to the humidity control element 110 (S205). In addition, when Hm is lower than 50% RH, the control circuit supplies a signal for starting a humidification operation of the humidity control element 110 to the humidity control element 110 (S207S205). Moreover, when Hm is equal to or lower than 70% RH and equal to or higher than 50% RH, the control circuit stops the dehumidification operation or the humidification operation of the humidity control element 110 (S209S207).

As described above, the control for the humidity control element 110 is executed. Thereafter, the control circuit checks the presence or absence of a stop instruction for the disk drive again (S202). If the stop instruction for the disk drive is detected, the control circuit ends the control of the disk drive device through a sequence of head retraction, disk rotation stop, circuit operation stop, and the like that are necessary for stopping the disk drive device 100 (S210).

In the second embodiment, since both the temperature sensor 113 and the humidity sensor 118 are used, it is possible to keep humidity in the housing constant even when a change in ambient temperature is small and a change in ambient humidity is large.

Figure 8:
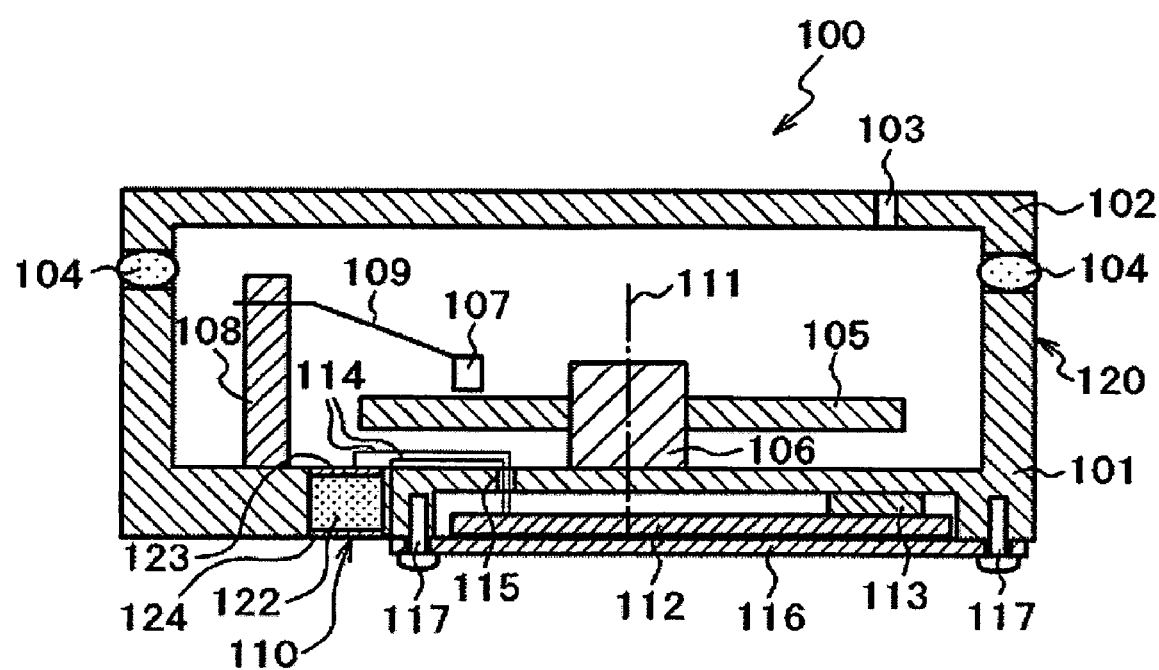
FIG. 8 is a vertical sectional view of a disk drive device in a third embodiment of the invention.

Next, the disk drive device 100 in a third embodiment of the invention will be explained using FIG. 8. FIG. 8 is a vertical sectional view of the disk drive device 100 in the third embodiment of the invention. The third embodiment is different from the first embodiment in points described below and is basically identical with the first embodiment in the other points.

In the third embodiment, the temperature sensor 113 is arranged to be in abutment against the base 101. Consequently, it is possible to detect ambient temperature even when the cover 116 is made of a material with a low thermal conductivity. In addition, it is possible to detect ambient temperature promptly because the base 101 with a lower thermal resistance is used as a heat conduction path.

Note that an installation location of the temperature sensor is not limited to the location described in the first embodiment or the third embodiment. Certain functions of the invention are attained as long as the installation location is in a mounting position where temperature changes following a temperature change outside the disk drive device. It is possible to detect temperature substantially the same as ambient temperature by mounting the temperature sensor 113 on, for example, the side wall of the base 101 and surfaces of the cover 102, the spindle motor 106 heat-conductively connected to the housing 120, the head drive device 108, the suspension arm 109, and the like as long as the locations are consistent with the idea of the invention. Thus, the invention includes control of the humidity control element 110 based on temperature detected in these locations. Moreover, it is also possible to use an output of the head 107 itself as a temperature sensor output. This is effective for a reduction in size and a reduction in cost of the device because it is unnecessary to set a temperature sensor anew.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk drive device including a disk drive mechanism that records information in a disk or reproduces information stored in the disk and a housing in which the disk drive mechanism is housed, the disk drive device comprising:
    a humidity control element configured to perform a dehumidification and humidification operation within the housing;
    a temperature sensor that detects ambient temperature of the disk drive device or a temperature of a portion of the disk drive device where temperature changes in substantially the same manner as the ambient temperature; and
    a control circuit that controls the humidity control element on the basis of a rapid change in temperature detected by the temperature sensor.

2. A disk drive device according to claim 1, wherein the humidity control element is configured to perform dehumidification and humidification of the inside of the housing.

3. A disk drive device according to claim 2, wherein the humidity control element includes a hydrogen ion conductor consisting of a solid electrolyte and at least two electrodes arranged in contact with the hydrogen ion conductor.

4. A disk drive device according to claim 2, wherein the control circuit is configured to control the humidity control element when the temperature detected by the temperature sensor is outside a predetermined temperature range.

5. A disk drive device according to claim 1, wherein the disk drive device has a humidity sensor that detects a humidity in an inner space of the disk drive device and the control circuit is configured to control the humidity control element on the basis of the temperature detected by the temperature sensor and the humidity detected by the humidity sensor.

6. A disk drive device according to claim 5, wherein the control circuit is configured to control the humidity control element on the basis of the humidity detected by the humidity sensor when the temperature detected by the temperature sensor is within a predetermined temperature range.

7. A disk drive device according to claim 1, further comprising:
a circuit board mounted with the control circuit and set outside the housing; and
a cover that covers the outside of the circuit board, and in that
the temperature sensor is mounted on the circuit board and held between the circuit board and the cover.

8. A disk drive device according to claim 7, wherein the humidity control element is configured to perform dehumidification and humidification of the inside of the housing.

9. A disk drive device according to claim 8, wherein the humidity control element includes a hydrogen ion conductor consisting of a solid electrolyte and at least two electrodes arranged in contact with the hydrogen ion conductor.

10. A disk drive device according to claim 8, wherein the control circuit is configured to control the humidity control element when the temperature detected by the temperature sensor is outside a predetermined temperature range.

11. A disk drive device according to claim 7, wherein the disk drive device has a humidity sensor that detects a humidity in an inner space of the disk drive device and the control circuit is configured to control the humidity control element on the basis of the temperature detected by the temperature sensor and the humidity detected by the humidity sensor.

12. A disk drive device according to claim 11, wherein the control circuit is configured to control the humidity control element on the basis of the humidity detected by the humidity sensor when the temperature detected by the temperature sensor is within a predetermined temperature range.

13. A disk drive device according to claim 1, wherein the temperature sensor is set in abutment against the housing.

14. A disk drive device according to claim 13, wherein the humidity control element is configured to perform dehumidification and humidification of the inside of the housing.

15. A disk drive device according to claim 14, wherein the humidity control element includes a hydrogen ion conductor consisting of a solid electrolyte and at least two electrodes arranged in contact with the hydrogen ion conductor.

16. A disk drive device according to claim 14, wherein the control circuit is configured to control the humidity control element when the temperature detected by the temperature sensor is outside a predetermined temperature range.

17. A disk drive device according to claim 13, wherein the disk drive device has a humidity sensor that detects a humidity in an inner space of the disk drive device and the control circuit is configured to control the humidity control element on the basis of the temperature detected by the temperature sensor and the humidity detected by the humidity sensor.

18. A disk drive device according to claim 17, wherein the control circuit is configured to control the humidity control element on the basis of the humidity detected by the humidity sensor when the temperature detected by the temperature sensor is within a predetermined temperature range.

19. A disk drive device according to claim 1, further comprising a circuit board mounted with the control circuit and set outside the housing,
wherein the temperature sensor is mounted on the circuit board and held between the circuit board and the housing.

20. A disk drive device according to claim 19, wherein the humidity control element is configured to perform dehumidification and humidification of the inside of the housing.

21. A disk drive device according to claim 20, wherein the humidity control element includes a hydrogen ion conductor consisting of a solid electrolyte and at least two electrodes arranged in contact with the hydrogen ion conductor.

22. A disk drive device according to claim 20, wherein the control circuit is configured to control the humidity control element when the temperature detected by the temperature sensor is outside a predetermined temperature range.

23. A disk drive device according to claim 19, wherein the disk drive device has a humidity sensor that detects a humidity in an inner space of the disk drive device and the control circuit is configured to control the humidity control element on the basis of the temperature detected by the temperature sensor and the humidity detected by the humidity sensor.

24. A disk drive device according to claim 23, wherein the control circuit is configured to control the humidity control element on the basis of the humidity detected by the humidity sensor when the temperature detected by the temperature sensor is within a predetermined temperature range.

25. A disk drive device according to claim 1, wherein the temperature sensor is set to detect temperature of components constituting the disk drive mechanism connected to the housing heat-conductively.

* * * * *